United States Patent [19]
Maruyama et al.

[11] Patent Number: 5,537,535
[45] Date of Patent: Jul. 16, 1996

[54] MULTI-CPU SYSTEM HAVING FAULT MONITORING FACILITY

[75] Inventors: Takumi Maruyama; Kiyoshi Sugita; Mitsunobu Yoshida, all of Kawasaki, Japan

[73] Assignee: Fujitsu Limited, Kanagawa, Japan

[21] Appl. No.: 216,141

[22] Filed: Mar. 21, 1994

[30] Foreign Application Priority Data

Sep. 20, 1993 [JP] Japan .................................. 5-233662

[51] Int. Cl.⁶ .................................................. G06F 11/20
[52] U.S. Cl. ....................................................... 395/183.01
[58] Field of Search .................................... 395/575, 650, 395/800, 183.01, 183.19; 371/8.2, 11.2; 324/500, 512, 158 R; 364/264, 281.9, 474.16, 474.19, 550, 943.9, 943.91, 949.4

[56] References Cited

U.S. PATENT DOCUMENTS

| | | | |
|---|---|---|---|
| 4,412,281 | 10/1983 | Works | 364/200 |
| 4,480,307 | 10/1984 | Budde et al. | 364/200 |
| 4,719,621 | 1/1988 | May | 370/85 |
| 4,787,033 | 11/1988 | Bomba et al. | 364/200 |
| 4,933,846 | 6/1990 | Humphrey et al. | 364/200 |
| 4,967,344 | 10/1990 | Scavezze et al. | 364/200 |
| 5,195,089 | 3/1993 | Sindhu et al. | 370/85.1 |
| 5,396,602 | 3/1995 | Amini et al. | 395/325 |

*Primary Examiner*—Robert W. Beausoliel, Jr.
*Assistant Examiner*—Stephen C. Elmore

[57] ABSTRACT

A multi-CPU system including a fault monitoring facility comprises a plurality of central processing units interconnected through a system bus and sending and receiving data through a plurality of bus interface units inserted in the system bus. A fault monitoring bus in parallel with the system bus is commonly accessed by the bus interface units. A bus interface unit which detects a fault notifies the other bus interface units simultaneously using the fault monitoring bus. Data-originating interface units and data-destination interface units receive fault information of the location and type of fault, which has occurred. Swift recovery from a faulty state is enabled.

7 Claims, 15 Drawing Sheets

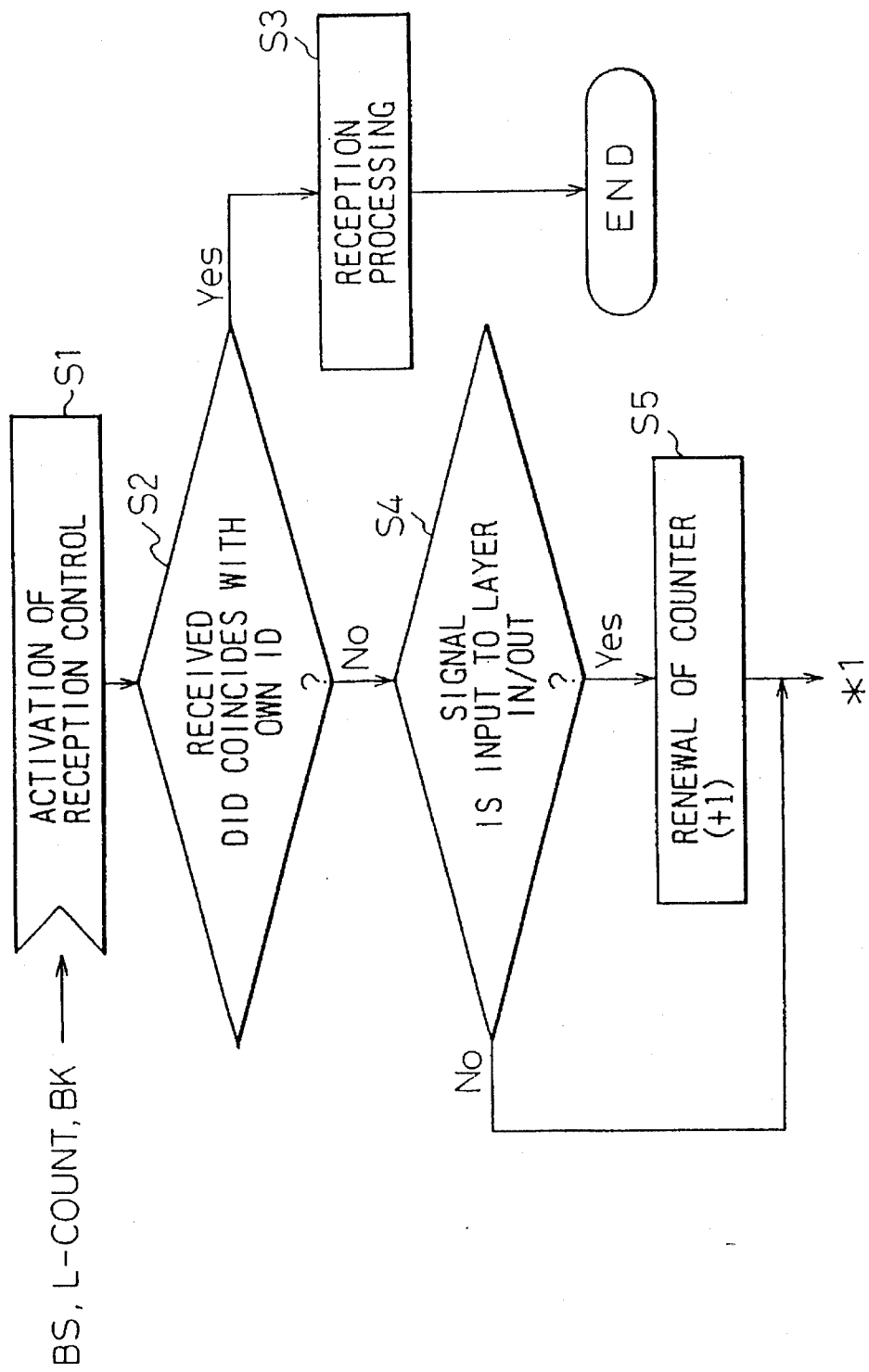

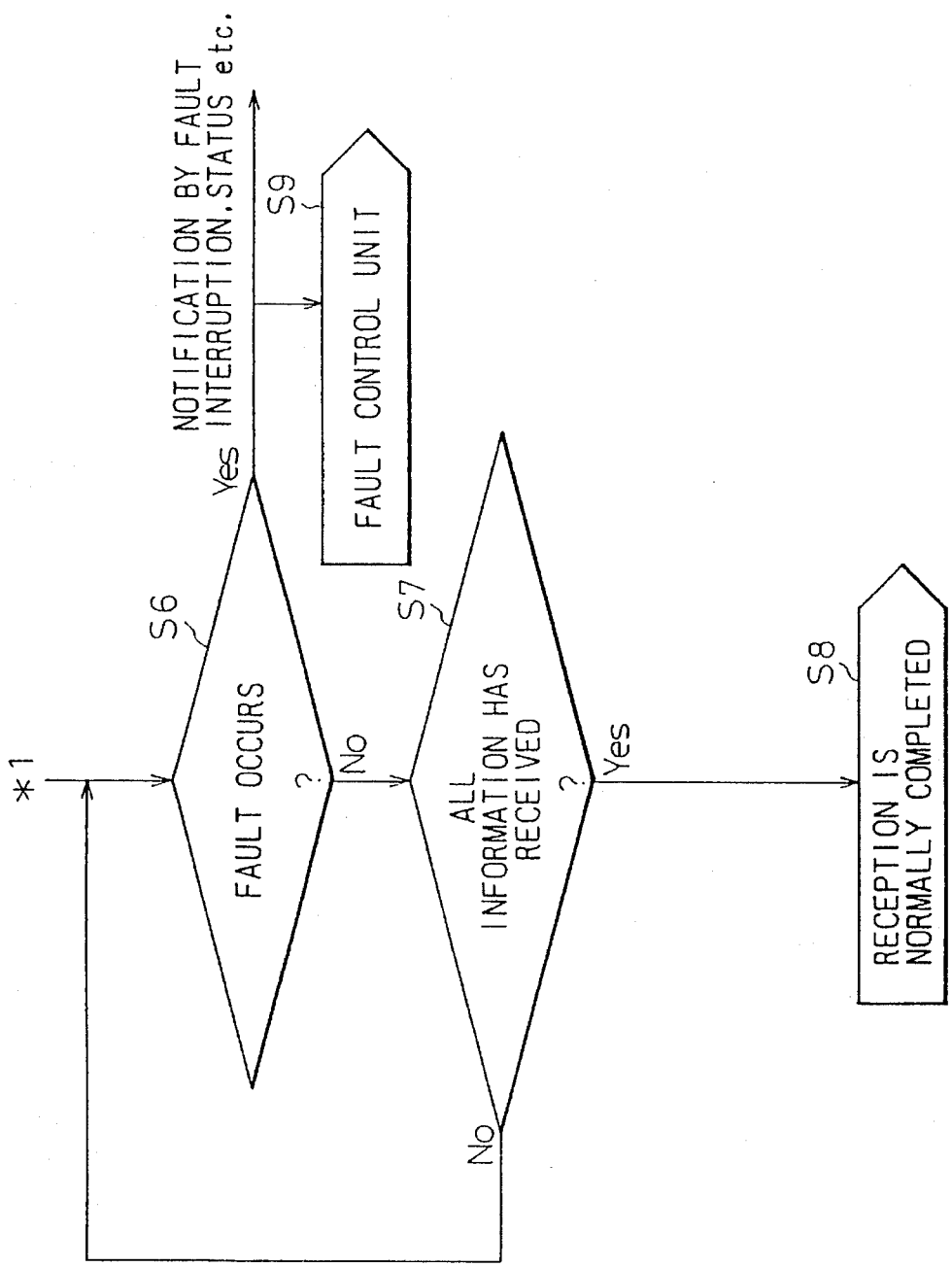

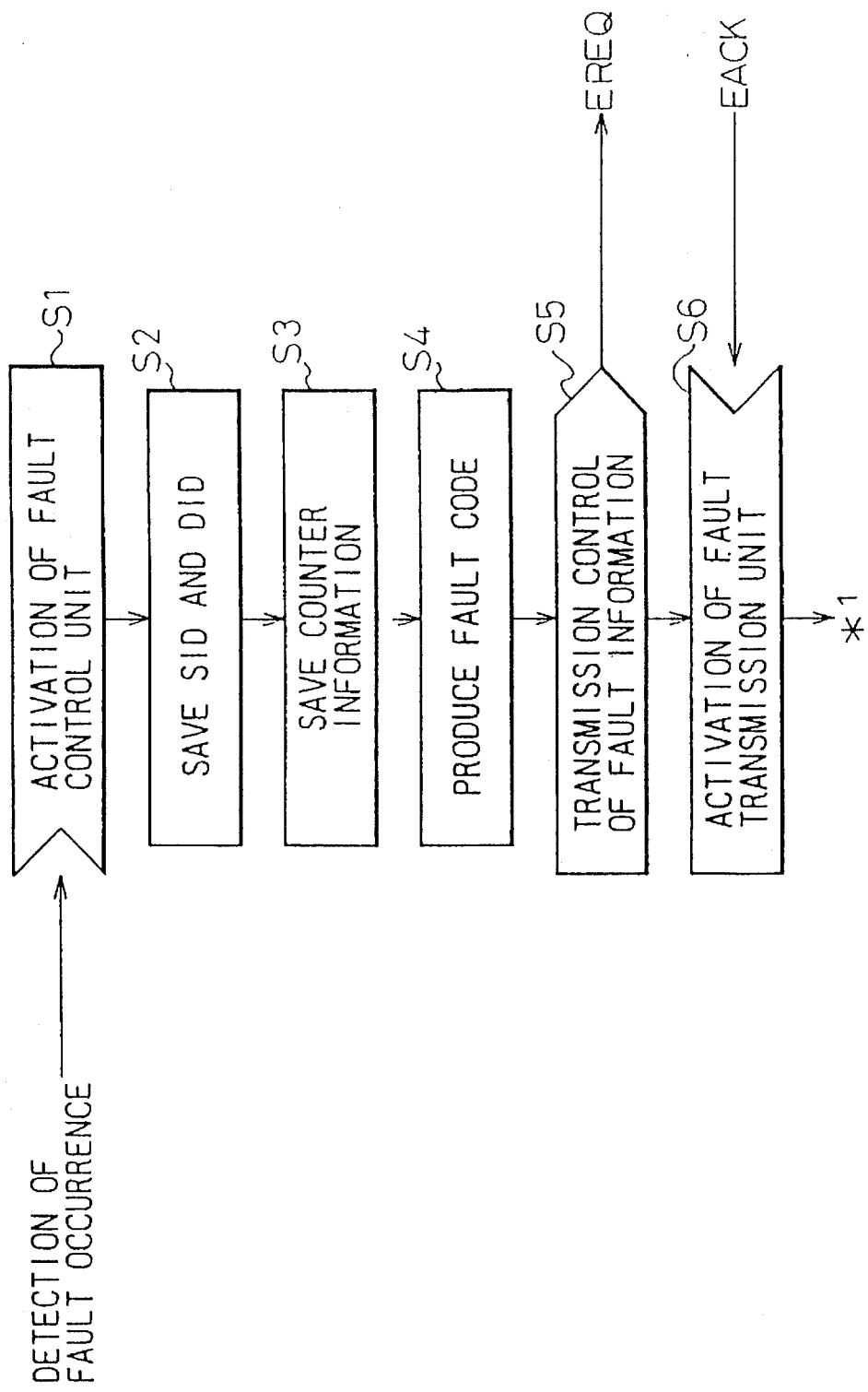

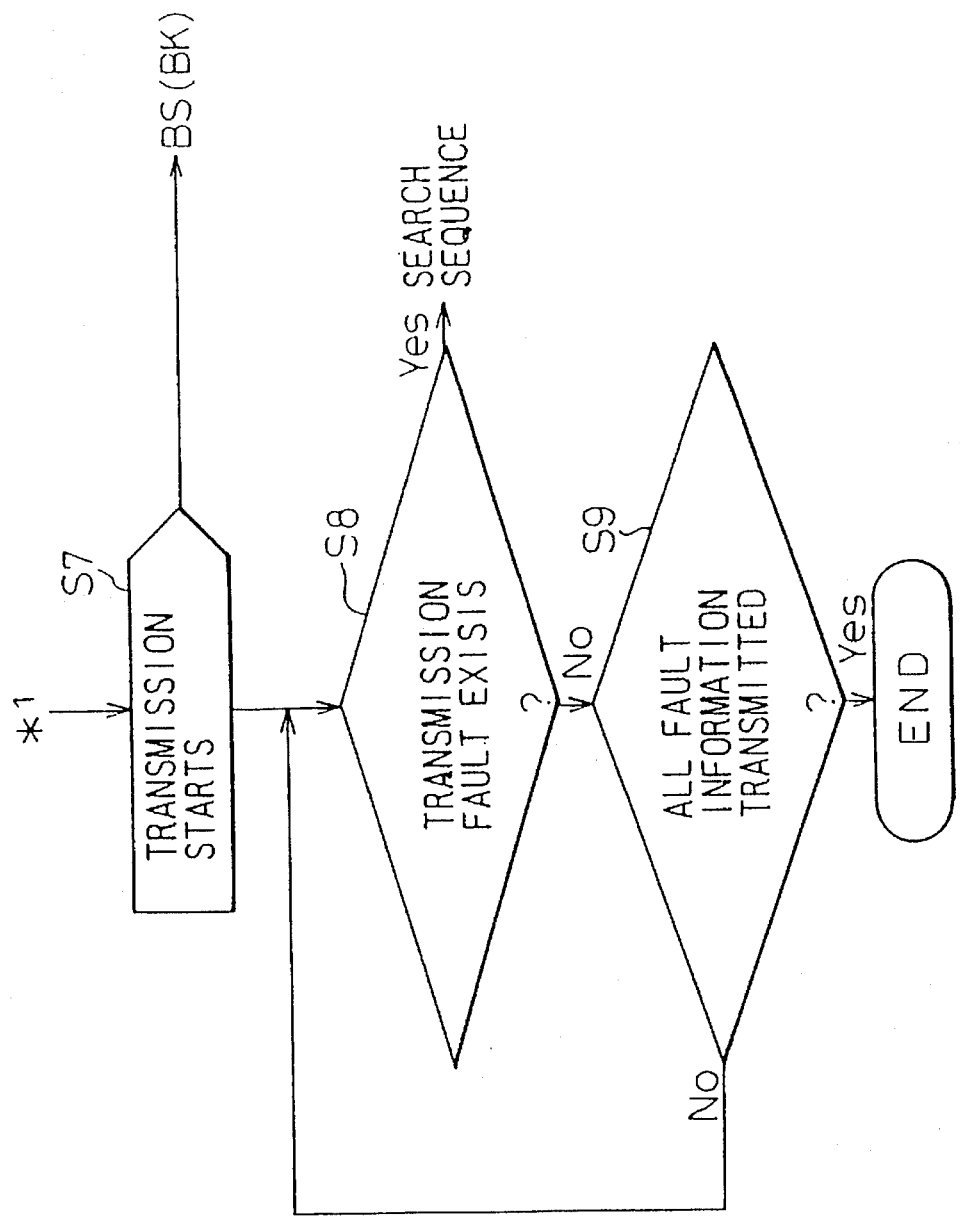

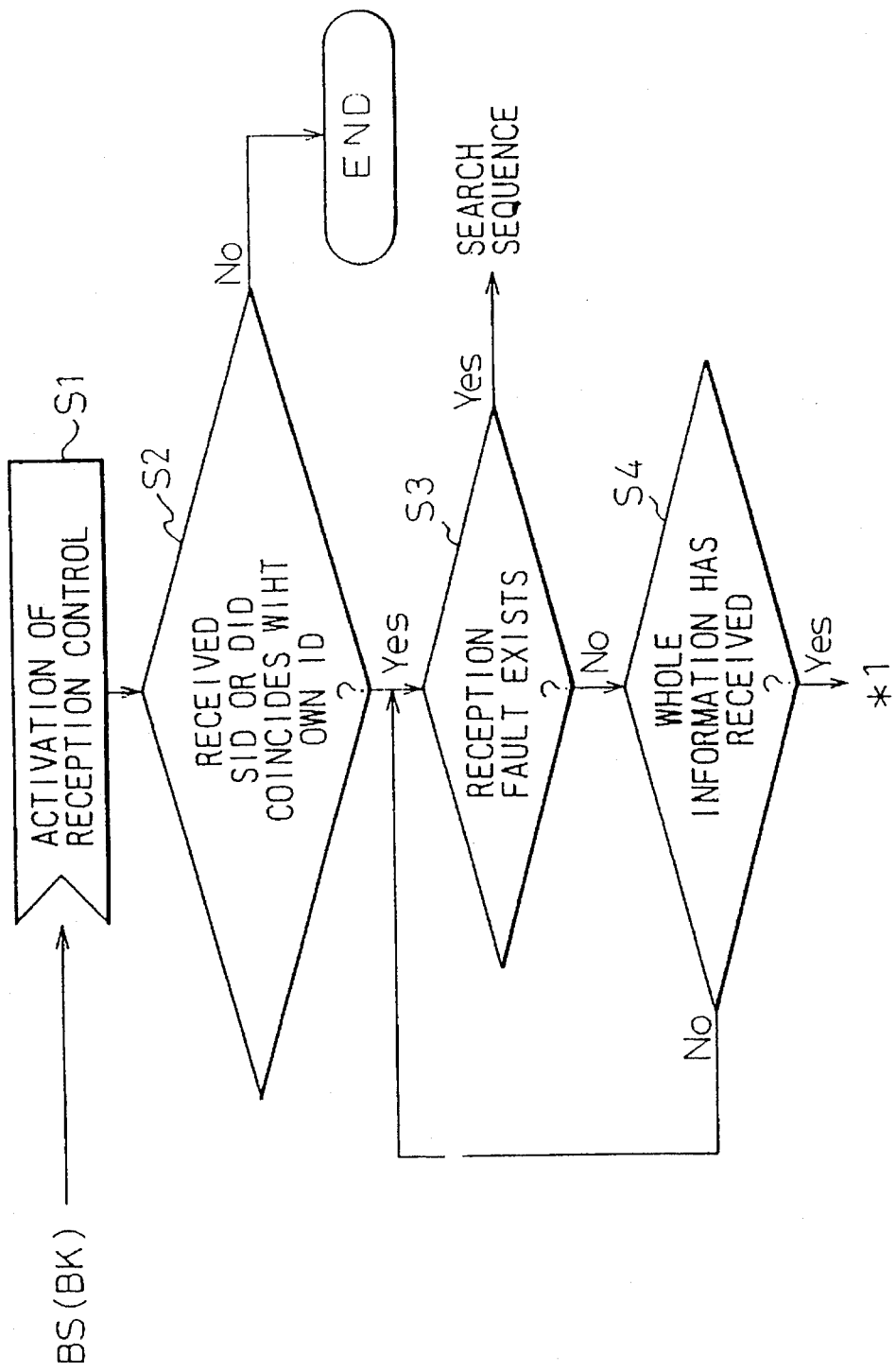

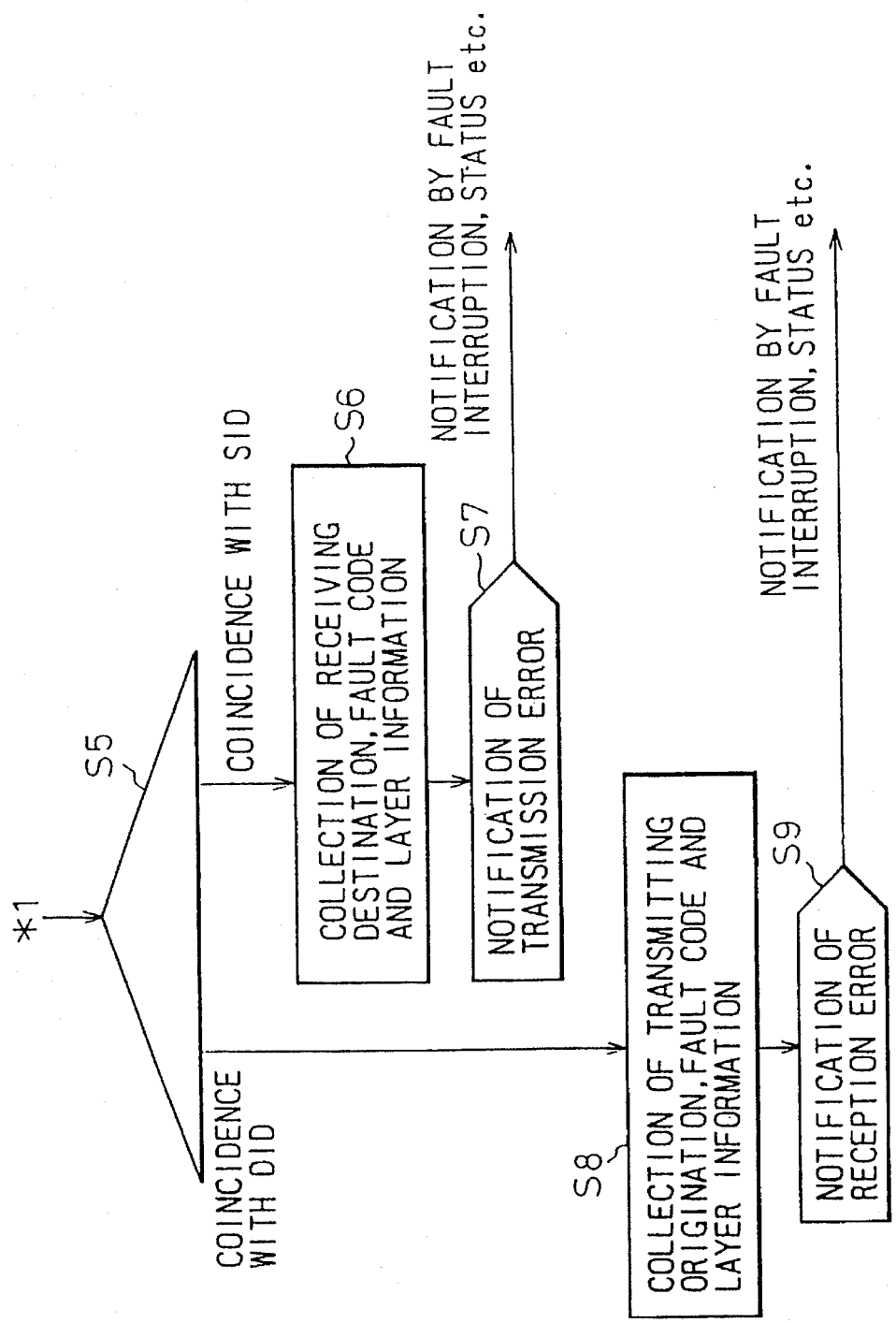

MULTI-CPU SYSTEM HAVING FAULT MONITORING FACILITY

BACKGROUND OF THE INVENTION

1. Field of the Invention

The present invention relates to a multi-central processing unit system (multi-CPU), more particularly a multi-CPU system provided with a fault monitoring facility for monitoring faults in the system.

A multi-CPU system to which the present invention is applied, is comprised of a plurality of central processing units connected through a system bus to each other. The system sends and receives data between these central processing units through a plurality of bus interface units inserted in the system bus.

The system bus for the above-mentioned multi-CPU system is known as a "TOX-BUS" and enables an extremely high speed and efficient bus transfer. For example, the system bus is effective for a base system in a duplex configured electronic exchange.

Such electronic exchanges require a particularly high reliability. Accordingly, it is necessary that some sort of fault monitoring facility be provided for the multi-CPU system of that base system.

2. Description of the Related Art as will be explained in detail later referring to the drawings, according to a conventional fault search sequence carried out in a multi-CPU system, one of the central processing units in the system accesses a first bus interface unit (BIU) and reads out and analyzes an error status and then accesses a second bus interface unit and reads out and analyzes the error state of the second bus interface unit. This operation is repeated until the faulty portion of the system is reached. Therefore, there was the first problem that it took a massive amount of time to find the fault and the time until restoration of the system was considerably prolonged.

Further, since it was not possible to access units ahead of (downstream side) the faulty portion, there was the second problem that the bus interface units, central processing units, and other functional units ahead of the faulty portion could not be notified of the occurrence of the fault. If it were possible for other central processing units to be notified of the occurrence of a fault, then the other central processing units could operate and deal with the faulty situation in the multi-CPU system.

SUMMARY OF THE INVENTION

Accordingly, the present invention, in consideration of the above-mentioned problems, has as its object the provision of a multi-CPU system provided with a fault monitoring facility which (1) enables swift restoration from a fault state and (2) enables functional units ahead of the faulty portion to be swiftly notified of the occurrence of the fault.

To attain the above object, the present invention is comprised of a multi-CPU system including a plurality of central processing units connected through a system bus to each other and sending and receiving data between these central processing units through a plurality of bus interface units inserted in the system bus. The system also includes a fault monitoring bus in parallel with the system bus and commonly accessed by all of the bus interface units. A bus interface unit which detects a fault simultaneously notifies all the other bus interface units providing fault information using the fault monitoring bus. The interface units of a sender of data and of a destination of the data receive the fault information and learn what kind of fault occurred and where in the system.

BRIEF DESCRIPTION OF THE DRAWINGS

The above objects and features of the present invention will be more apparent from the following description of the preferred embodiments taken with reference to the accompanying drawings, wherein:

FIG. 10 is a view of the flow of the control of reception with respect to the system bus of the bus interface units (part 1) in accordance with the invention;

FIG. 11 is a view of the flow of the control of reception with respect to the system bus of the bus interface units (part 2) in accordance with the invention;

FIG. 12 is a view of the flow of the control of transmission with respect to the fault monitoring bus of the bus interface units (part 1) in accordance with the invention;

FIG. 13 is a view of the flow of the control of transmission with respect to the fault monitoring bus of the bus interface units (part 3) in accordance with the invention;

FIG. 14 is a view of the flow of the control of reception with respect to the fault monitoring bus of the bus interface units (part 1) in accordance with the invention; and FIG. 15 is a view of the flow of the control of reception with respect to the fault monitoring bus of the bus interface units (part 2) in accordance with the invention.

DESCRIPTION OF THE PREFERRED EMBODIMENTS

Before describing the embodiments of the present invention, the related art and the problems therein will be first described with reference to the related figures.

Figure 1:
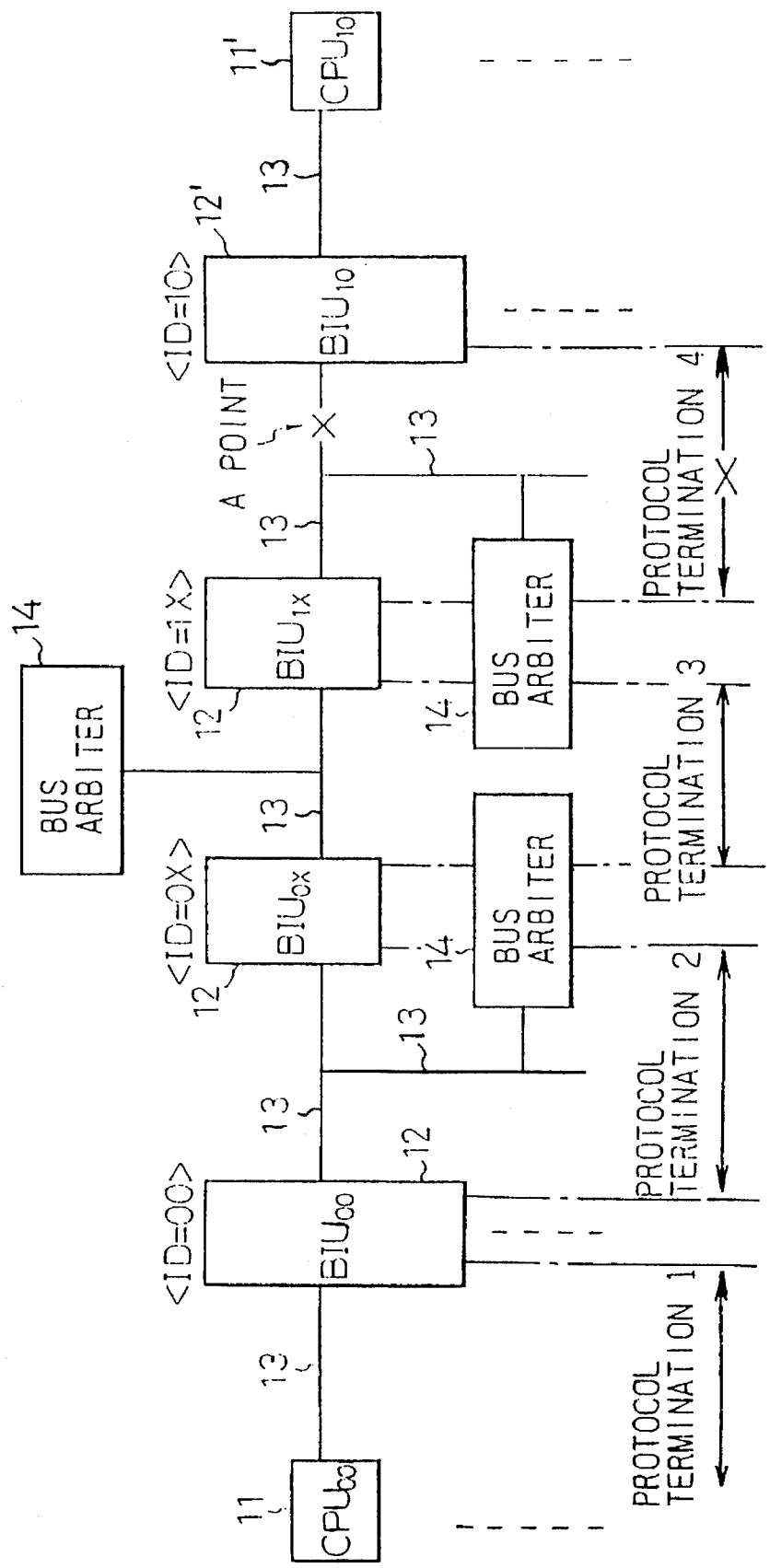
FIG. 1 is a view of a conventional general multi-CPU system to which the present invention is applied.

FIG. 1 is a view of a general multi-CPU system to which the present invention is applied. In the figure, a plurality of central processing units 11, 11' (for simplification, just two are shown at the right and left of the figure) are connected to each other by the system bus 13. This system bus 13 has a plurality of bus interface units (BIU) 12, 12' in it, through which bus interface units the central processing units send and receive data. Note that the left and right sides of the figure have dotted lines drawn extending in the vertical direction of the figure. These dotted lines indicate a construction where there are a plurality of elements of substantially the same configuration and connection as the central processing units 11, 11'—system bus 13—bus interface units 12, 12'—system bus 13, which are illustrated. Note that the system bus 13 is shared by a plurality of bus interface units. When transmitting data, the bus interface units first have to acquire a transmission right for transmitting the data, that is, a right of using the system bus 13. Accordingly, bus arbiters 14, 14' are provided.

Further, in the figure, the units (CPU, BIU) given the subscripts $\underline{00}$ or $\underline{0X}$ show units of the 0-system group in a system adopting a duplex construction, while the units (CPU, BIU) given the subscripts $\underline{10}$ or $\underline{1X}$ show units of the 1-system group. The "X" in the subscripts 0X and 1X show numerals 1, 2, 3 . . . That is, the subscripts are equivalent to ID (identification) numbers.

Data is transmitted and received between the central processing units by independent bus communication protocol termination ("protocol termination 1" . . . "protocol termination 4") between an adjoining central processing unit and bus interface unit (BIU) and between two adjoining bus interface units (BIU). In this case, the transmission side bus interface unit 12 transfers data in bursts to the system bus 13 so as to send a large amount of data all at once, so the bus transfer cycle becomes a minimum, the bus transfer capability of the system bus 13 is improved, and a high speed, efficient system is set up.

Here, if it is assumed that a fault has occurred at the portion marked by the x in the figure (point A), the central processing unit $CPU_{00}$, which had tried to send data to the central processing unit $CPU_{10}$, does not receive a response from the central processing unit $CPU_{10}$ which would indicate that $CPU_{10}$ has received the data. Thus, $CPU_{00}$ determines that a fault has occurred somewhere in the system. Therefore, the central processing unit $CPU_{00}$ enters into a fault search sequence for pinpointing the faulty portion and finding the details of the fault.

The fault search sequence is performed by accessing the bus interface units 12 of the terminating points of the bus communication protocol through the system bus 13 from the central processing unit $CPU_{10}$ side and successively reading out the error statuses from the bus interface units 12.

According to the above-mentioned conventional fault search sequence, as mentioned earlier, the central processing unit $CPU_{00}$ accesses a first bus interface unit (BIU) and reads out and analyzes the error status. Then $CPU_{00}$ accesses a second bus interface unit and reads out and analyzes the error state of the same. It repeats this operation until the faulty portion is reached. Therefore, there is a first problem that it takes a massive amount of time to search for the fault, and the time until restoration of the system is considerably delayed.

Further, as mentioned earlier, since it is not possible to access the units ahead (downstream) of the faulty portion (x mark), there is the second problem that the bus interface units, central processing units, ($BIU_{00}$ and $CPU_{10}$) and other functional units ahead of the fault portion could not be notified of the occurrence of the fault. If it were possible for the central processing unit $CPU_{10}$ to be notified of the occurrence of a fault, then the central processing unit $CPU_{10}$ could operate and deal with the faulty situation in the multi-CPU system.

The present invention, which solves these problems, will now be explained in further detail.

Figure 2:
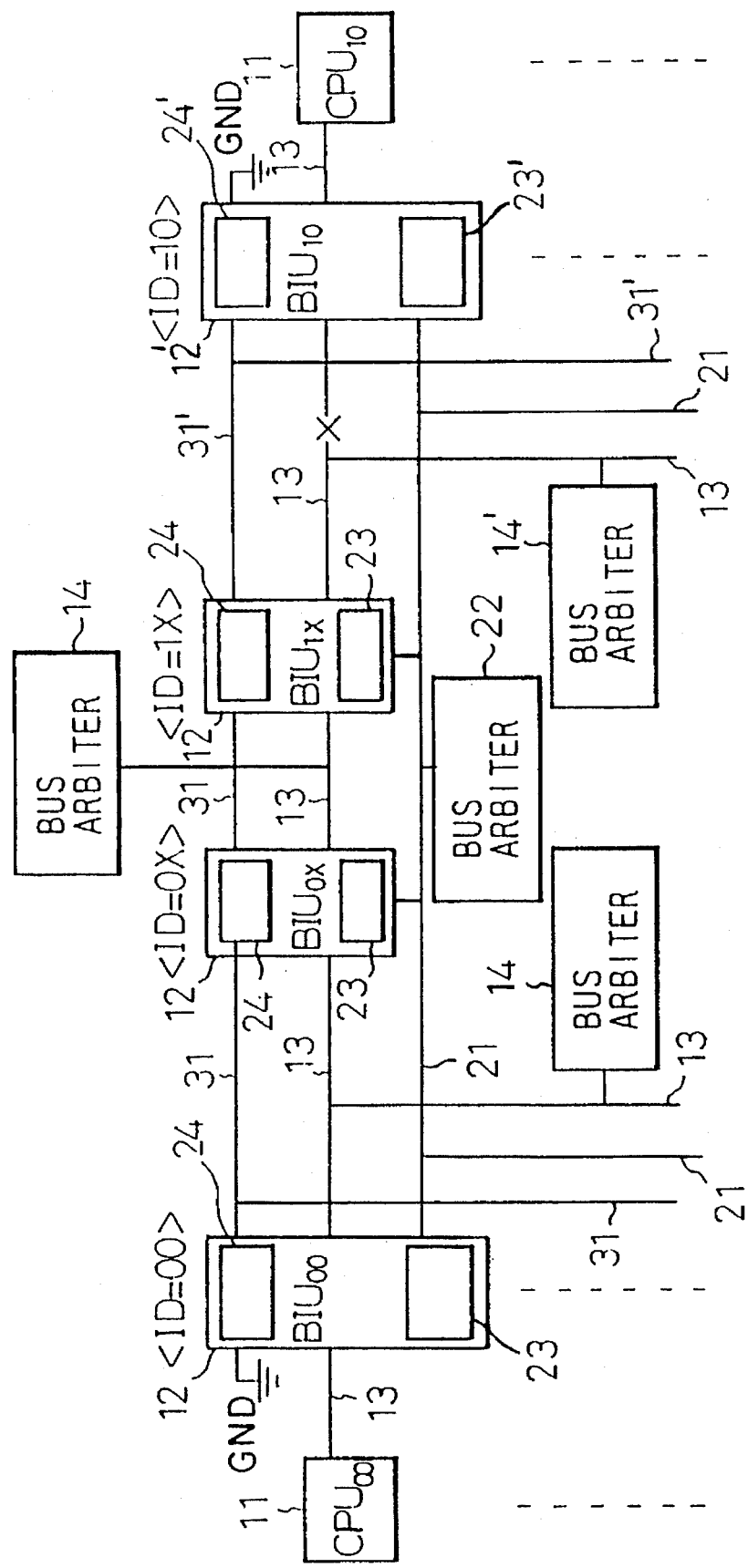
FIG. 2 is a view of the basic configuration of a multi-CPU system according to the present invention.

FIG. 2 is a view of a basic configuration of a multi-CPU system according to the present invention. Note that throughout all the figures, similar constituent elements are given the same reference numerals or symbols. The basic difference from FIG. 1 is the provision of a fault monitoring bus 21. That is, the plurality of central processing units 11, 11' are connected with each other through the system bus 13. Data is sent and received between the central processing units 11, 11' through a plurality of bus interface units 12, 12' in the system bus 13. The data is transmitted and received by independent bus communication protocol terminations between an adjoining central processing unit 11 and bus interface unit 12, and between two adjoining bus interface units 12. To this general multi-CPU system, there is added the fault monitoring bus 21, which is commonly accessed by the bus interface units 12, 12' and is provided in parallel with the system bus 13.

When a fault occurs, the bus interface unit 12 which detects the fault acts as the master unit and sends out fault information on the fault monitoring bus 21. The other bus interface units 12 are slaved to the master unit and enter a mode for receiving fault information on the fault monitoring bus 21.

When a fault occurs, the fault monitoring bus 21, shared by all the bus interface units (BIU) 12, 12', is activated. Then the fault search sequence is executed, so it is possible to immediately search for the fault in the system as a whole without going through the protocol termination 1, protocol termination 2 . . . as in the past. Further, even if a fault occurs on the system bus 13 at the portion marked by the x in FIG. 2, the bus interface unit $BIU_{10}$ ahead of the fault can be notified of the occurrence of the fault. Accordingly, the central processing unit $CPU_{10}$ can learn of the occurrence of the fault.

Figure 3:
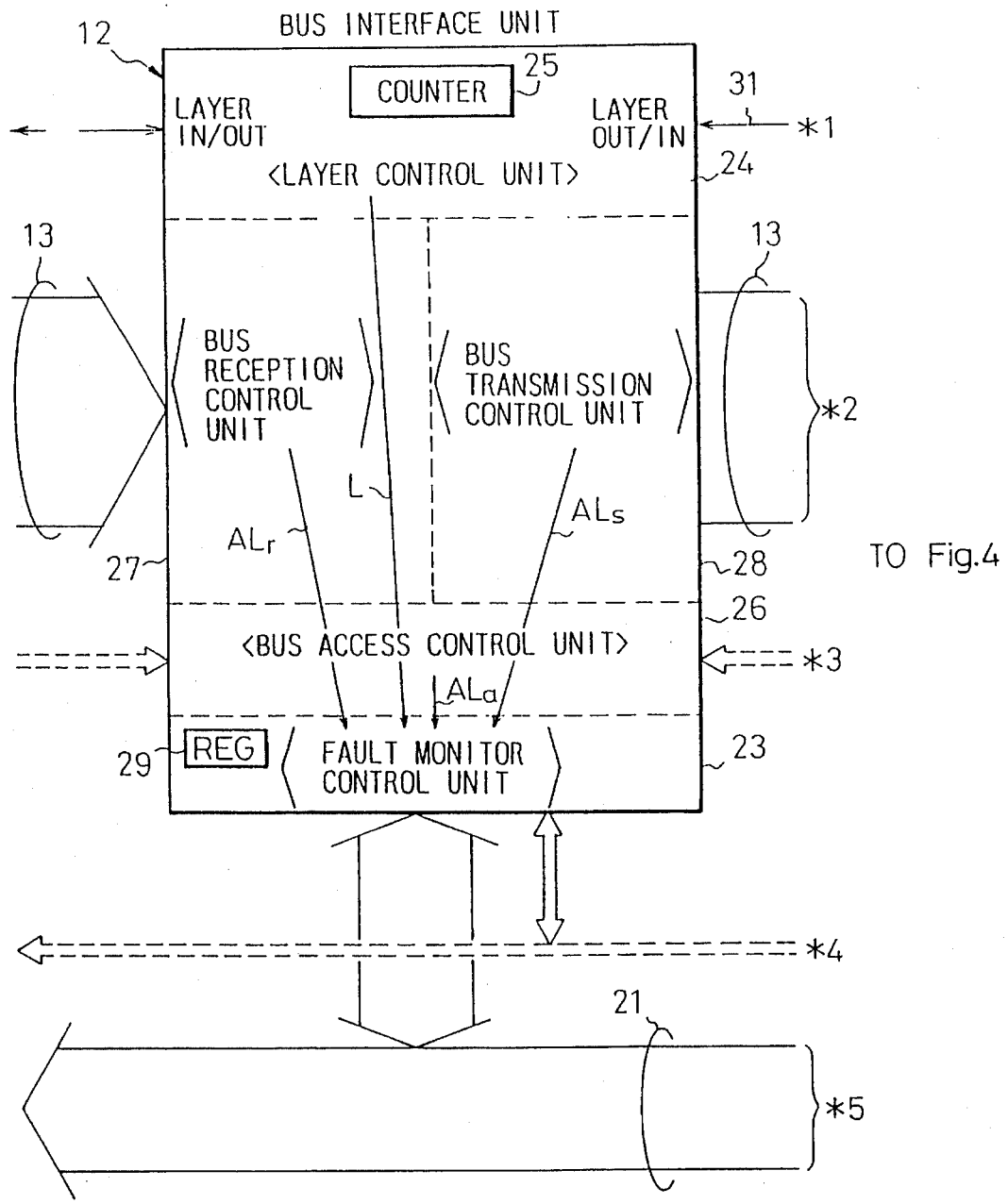
FIG. 3 is a view of a first example of a multi-CPU system according to the present invention (part 1)
Figure 4:
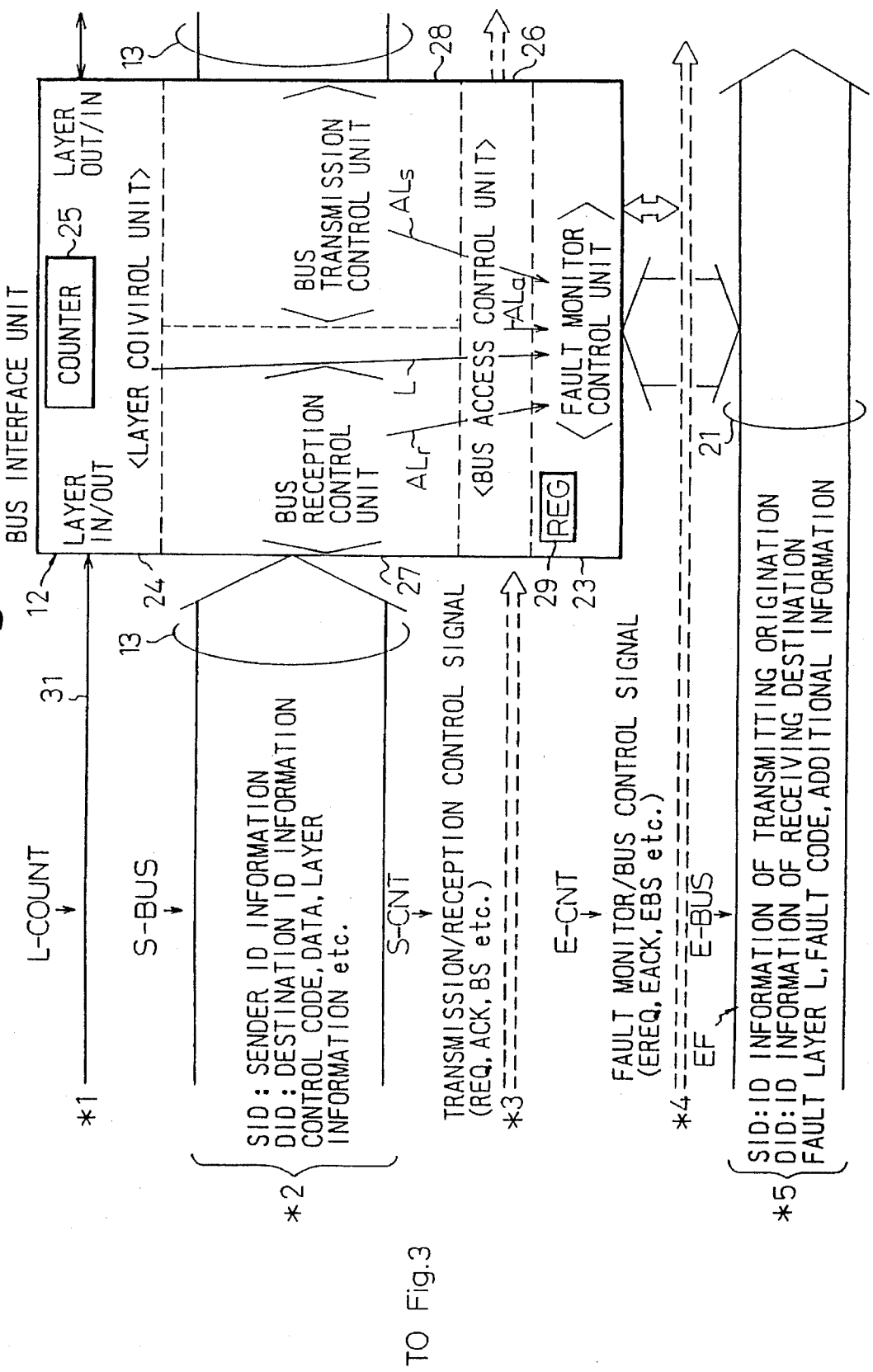
FIG. 4 is a view of a first example of a multi-CPU system according to the present invention (part 2)

FIG. 3 and FIG. 4 illustrate a first example of a multi-CPU system according to the present invention. These figures show enlarged views of portions of the multi-CPU system according to the present invention. In particular, in these figures, the internal configuration of the bus interface units 12, 12' and the configuration of the various buses and lines extending among the plurality of bus interface units 12, 12' are drawn in detail.

The bus interface units 12 are each provided with a fault monitor/control unit 23 for monitoring for occurrence of faults detected in the system and for preparing fault information and sending it on to the fault monitoring bus 21 when such a fault occurs.

The fault information prepared by the fault monitor/control unit 23 is prepared as an error information frame (EF) (FIG. 4). The error information frame EF has in it an area containing sender ID information SID, which specifies the origin of the transmission of data and destination ID information DID, which specifies the intended destination of the data.

Each of the bus interface units 12 is further provided with a layer control unit 24 for administering the number of bus interface units 12 which are relayed through until reception of the data. When a fault occurs, the number of units relayed is written as fault layer information L in the error information frame EF through the fault monitor/control unit 23.

Further, a layer count line 31 is provided that connects the layer control units 24 in two adjoining bus interface units 12. In each layer control unit 24 is provided a counter means 25 for incrementing the number of relayed units notified through the layer count line 31 each time data is relayed by a layer control unit 24, and using the sum as the fault layer information L.

The error information frame EF formed by the fault monitor/control unit 23 further has an area in which a fault code is written of the fault which has been detected, and additional information giving details of the fault is written.

The fault monitor/control unit 23 is provided with a register means (REG) 29 for holding the sender ID information SID, the destination ID information DID, and the number of relayed units from the counter means 25 (fault layer information L) when a fault occurs.

When a fault occurs, the bus interface unit 12 which detects the fault acts as the master unit and activates the fault monitoring bus 21. The other, that is, slaved bus interface units 12 in this case, recognize that a transmission error has occurred in the transmitted data when the sender ID information SID they have received matches their own ID, and send the fault information shown in the error information frame EF to the respectively associated central processing unit 111. If the bus interface unit 12 corresponding to the SID is the bus interface unit $BIU_{00}$ shown in FIG. 2, the central processing unit 11 which is notified is the central processing unit $CPU_{00}$ shown in FIG. 2.

On the other hand, when the destination ID information DID matches with their own ID, that is, when the slaved bus interface units 12 receive destination ID information DID matching their own ID's, they recognize that a reception error has occurred in the data which had been transmitted for them to receive and report the fault information shown in the error information frame EF to the respectively associated central processing unit 11. If the bus interface unit 12' corresponding to the DID is the bus interface unit $BIU_{10}$ shown in FIG. 2, the central processing unit 11' which is notified is the central processing unit $CPU_{10}$ of FIG. 2.

In using the fault monitoring bus 21, just as in using the system bus 13, the fault monitor/bus control signal (E-CNT) is sent back and forth. Accordingly, the fault monitor/control unit 23 sends out a bus access request (E-REQ) to the fault monitoring bus 21 when a fault occurs, receives a bus access acknowledgment (E-ACK) in response to this request, and starts transmission and reception of data as a master unit.

In this case, the bus arbiter 22 shown in FIG. 2 receives the bus access request (E-REQ) and decides whether or not to issue a bus access acknowledgement (E-ACK).

Figure 5:
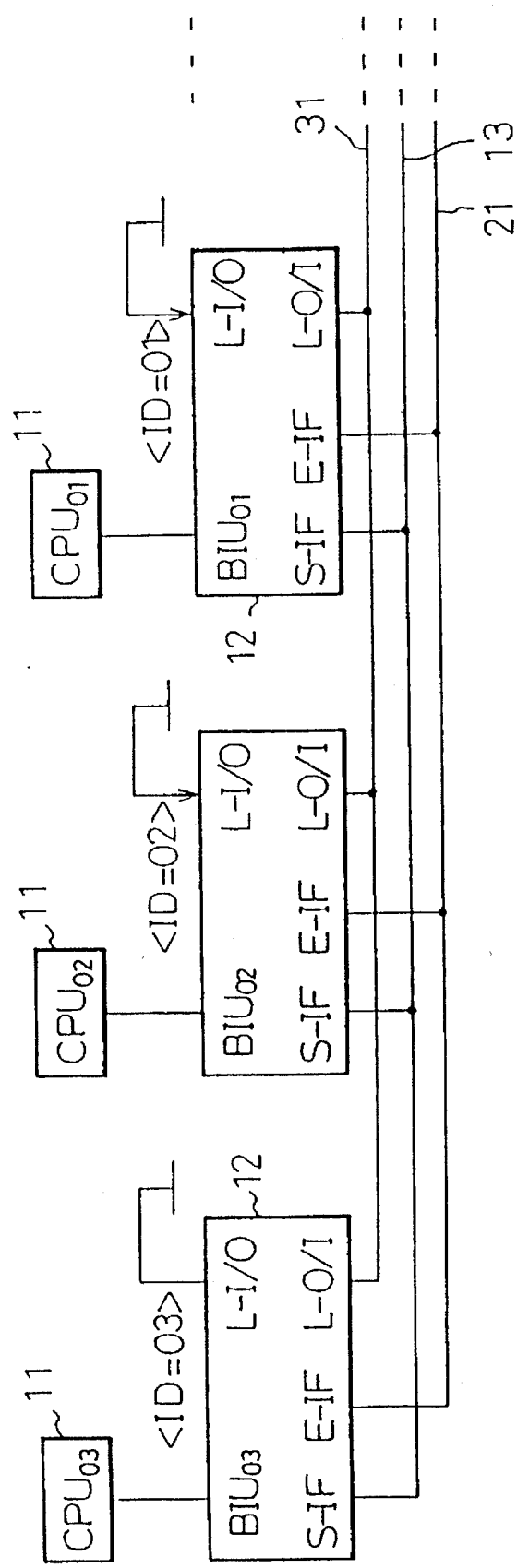
FIG. 5 is a view of a part of the system configuration not shown in FIG. 2.

FIG. 5 is a view of a part of the system configuration not shown in FIG. 2. This portion is the portion indicated at the left side of FIG. 2 by the dotted line extending in the vertical direction. In FIG. 5, however, the direction is changed from vertical to horizontal.

The portion including the central processing unit $CPU_{01}$, the central processing unit $CPU_{02}$, and the central processing unit $CPU_{03}$ is, in the case of the previously mentioned electronic exchange, for example, a plurality of communication control equipments comprised of isolated boards (cards) and external storages.

In FIG. 5, the L-I/O in each bus interface unit 12 is a layer IN/OUT shown in FIG. 3 and FIG. 4. Similarly, L-O/I is the layer-OUT/IN. Further, S-IF includes a bus access control unit 26, bus reception control unit 27, and bus transmission control unit 28, while E-IF is a fault monitor/control unit 23 and a layer control unit 24.

Figure 6:
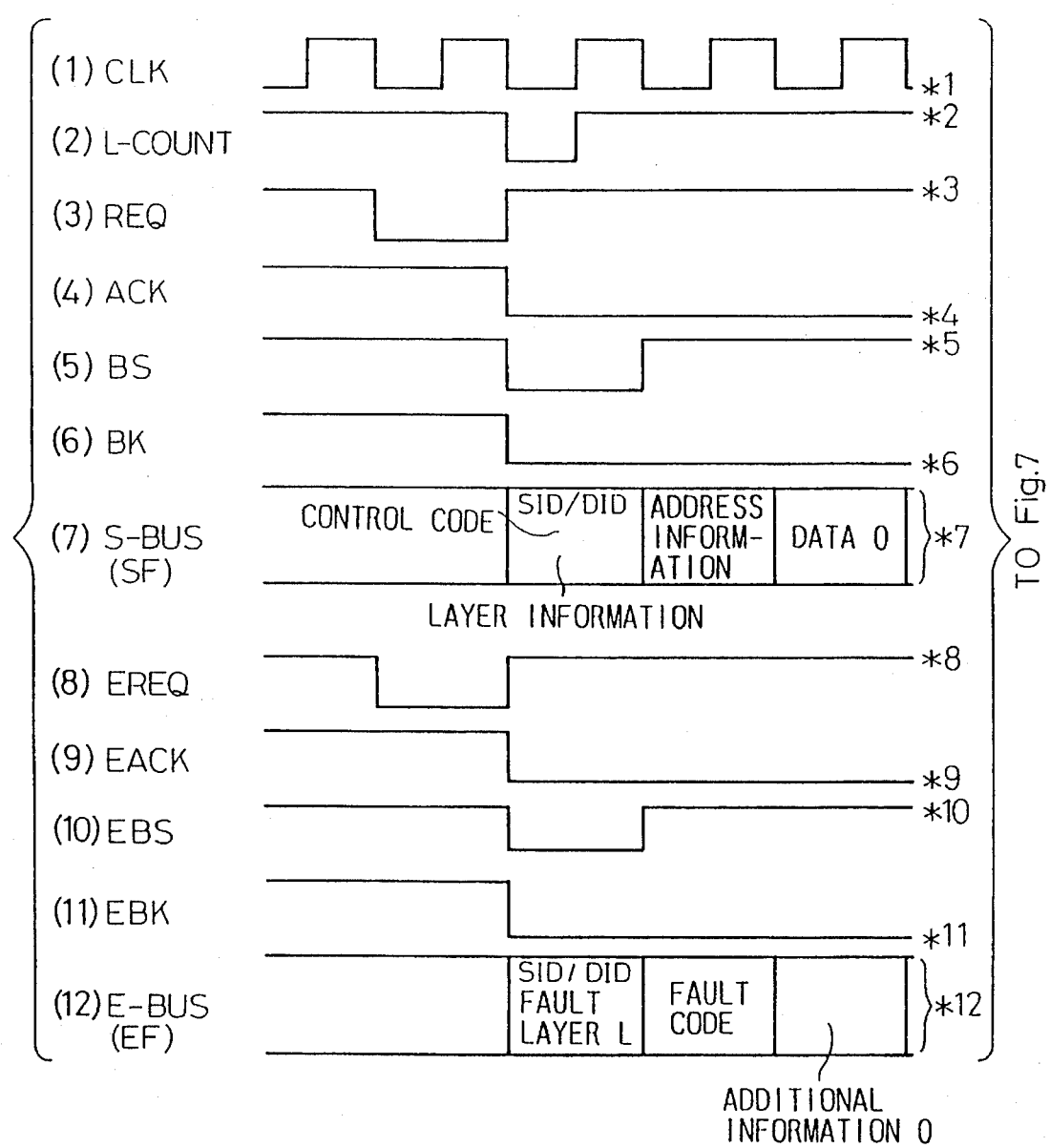
FIG. 6 is a time chart of an example of the operation according to the present invention (part 1)
Figure 7:
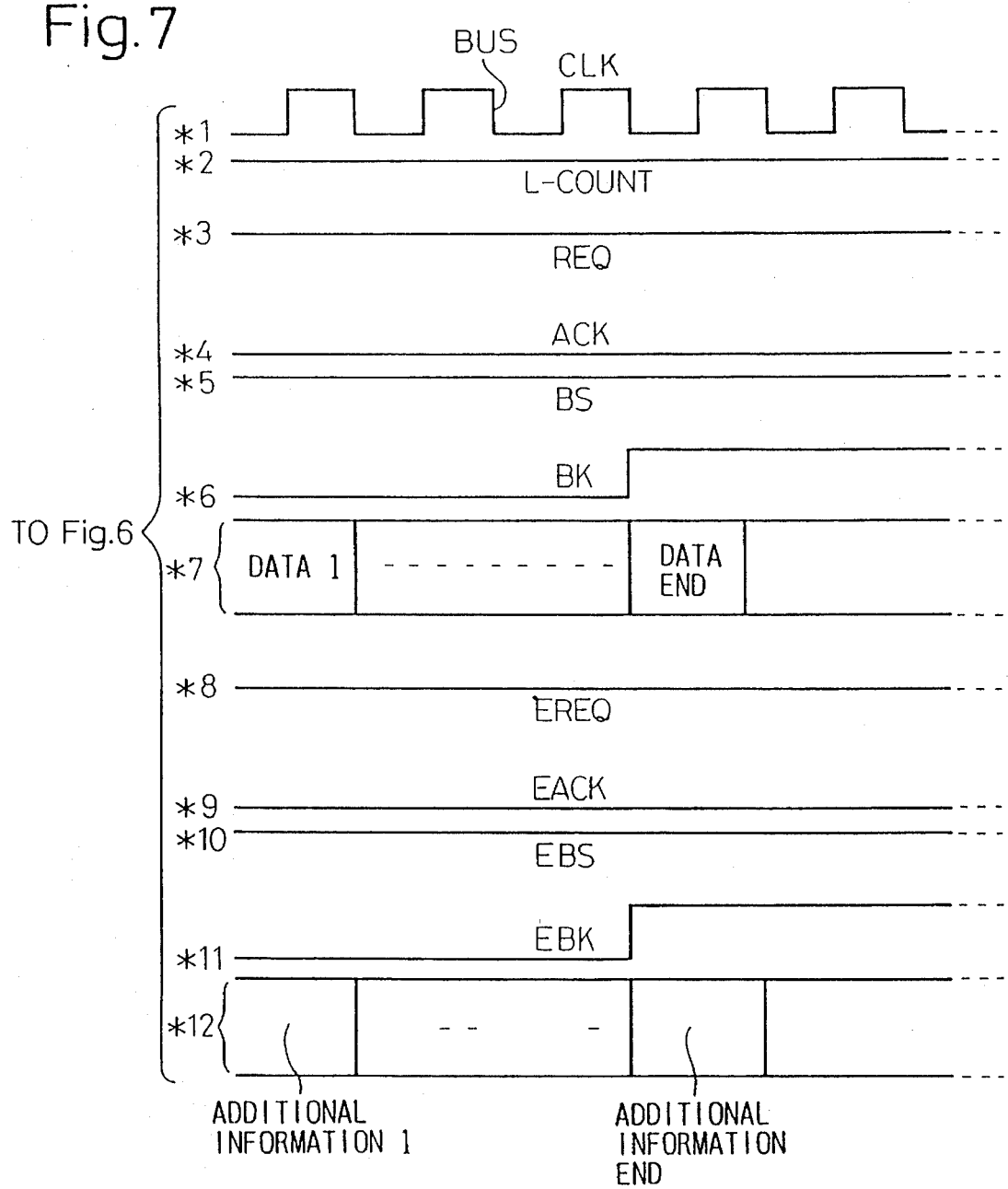
FIG. 7 is a time chart of an example of the operation according to the present invention (part 2)

FIG. 6 and FIG. 7 are time charts of an example of the operation according to the present invention and mainly show the operation when the configuration is as shown in FIG. 3 and FIG. 4.

FIG. 6 and FIG. 7 show the main types of signals and data arranged in the rows (1) to (12), which are as follows:

(1) A bus clock (CLK). All of the buses (system bus (S-BUS)) 13 and fault monitoring bus (E-BUS) 21)) operate in synchronization with the bus clock.

(2) A layer count signal (L-COUNT) transferred on the layer count line 31, under which signal the counter means 25 is driven and the previously mentioned fault layer information L (indicating where the fault has occurred) is produced.

When the L-COUNT of FIG. 6 is "L" it indicates that one section of data (for example, a block) has been relayed. Before this L-COUNT of "L" is output, however, the bus interface unit which is to output the "L" must capture the system bus 13.

(3) A bus access request signal (REQ) ("U"), which is output as one of the transmission/reception control signals S-CNT shown in FIG. 4.

(4) An acknowledgment signal (ACK) ("L"), which when returned in response to the bus access request signal REQ, enables the system bus 13 to be exclusively occupied.

(5) A bus start signal (BS) ("L"), which when output commences the inherent communication (data transmission).

(6) A block transfer notification signal (BK) ("L"), which is sent out on the system bus 13 for indicating to the other party that a block of a large number of words is transferred at the same time.

(7) The inherent data (S-BUS), which is transferred on the system bus 13 are shown in FIG. 3 and FIG. 4. The S-BUS composing the system bus information frame SF includes the previously mentioned SID/DID, the control codes (for example, read or write operation of the memory), the address information at that time, and, for example, in the case of a memory write operation, the write data (data 0, data 1, ... )

In the S-BUS shown in FIG. 4, fault layer information (L) is employed for the fault monitoring in the present invention. This layer information shows the number of bus interface units (BIU) which are relayed through. If the number of relayed units shown in the frame (SF) (see (6) in FIG. 6) received by the bus interface unit of FIG. 3 is N, then the bus interface unit of FIG. 4 receiving the L-COUNT signal from the layer count line 31 increments the number of relayed units (N) by 1 at the counter means 25 and once again sends out the SF.

Here, assume that the occurrence of a certain fault has been detected in the bus interface unit (BIU) 12 of FIG. 3. The fault is sometimes detected as the reception alarm $AL_r$, in the bus reception control unit 27, is sometimes detected as the transmission alarm $AL_r$ in the bus transmission alarm $AL_a$ by the bus access control unit 26. control unit 28, and is sometimes detected as the bus access (8) A bus access request (EREQ), which is first sent out by the control part of the fault monitor/control unit 23 on the fault monitoring bus 21 when any one of the above alarms (AL) is detected by the monitor part of the fault monitor/control unit 23.

(9) An acknowledge signal (EACK) ("L"), which the bus arbiter 22 receiving the signal EREQ ("L") sends back if the bus 21 is idle.

(10) A bus start signal (EBS), which is output in the same way as the above-mentioned (5).

(11) A block transfer notification signal (EBK), similar to that in the above-mentioned (6), which is output.

(12) A fault information (E-BUS), which is sent out in the form of the error information frame EF on the fault monitoring bus 21. Details of this fault information have already been discussed and are also shown in FIG. 6 and FIG. 7.

Figure 8:
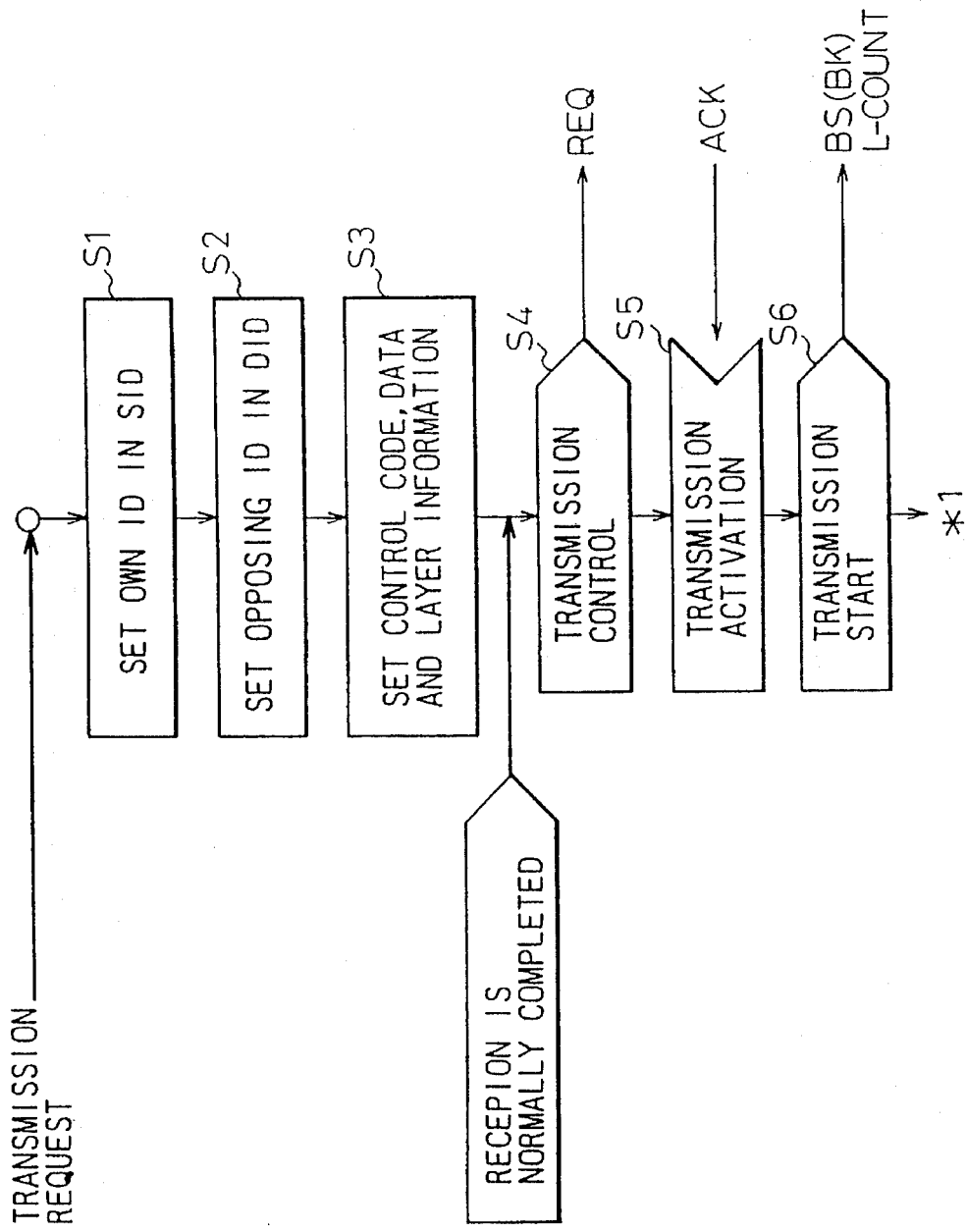
FIG. 8 is a view of the flow of the control of transmission with respect to the system bus of the bus interface in accordance with the invention (part 1)
Figure 9:
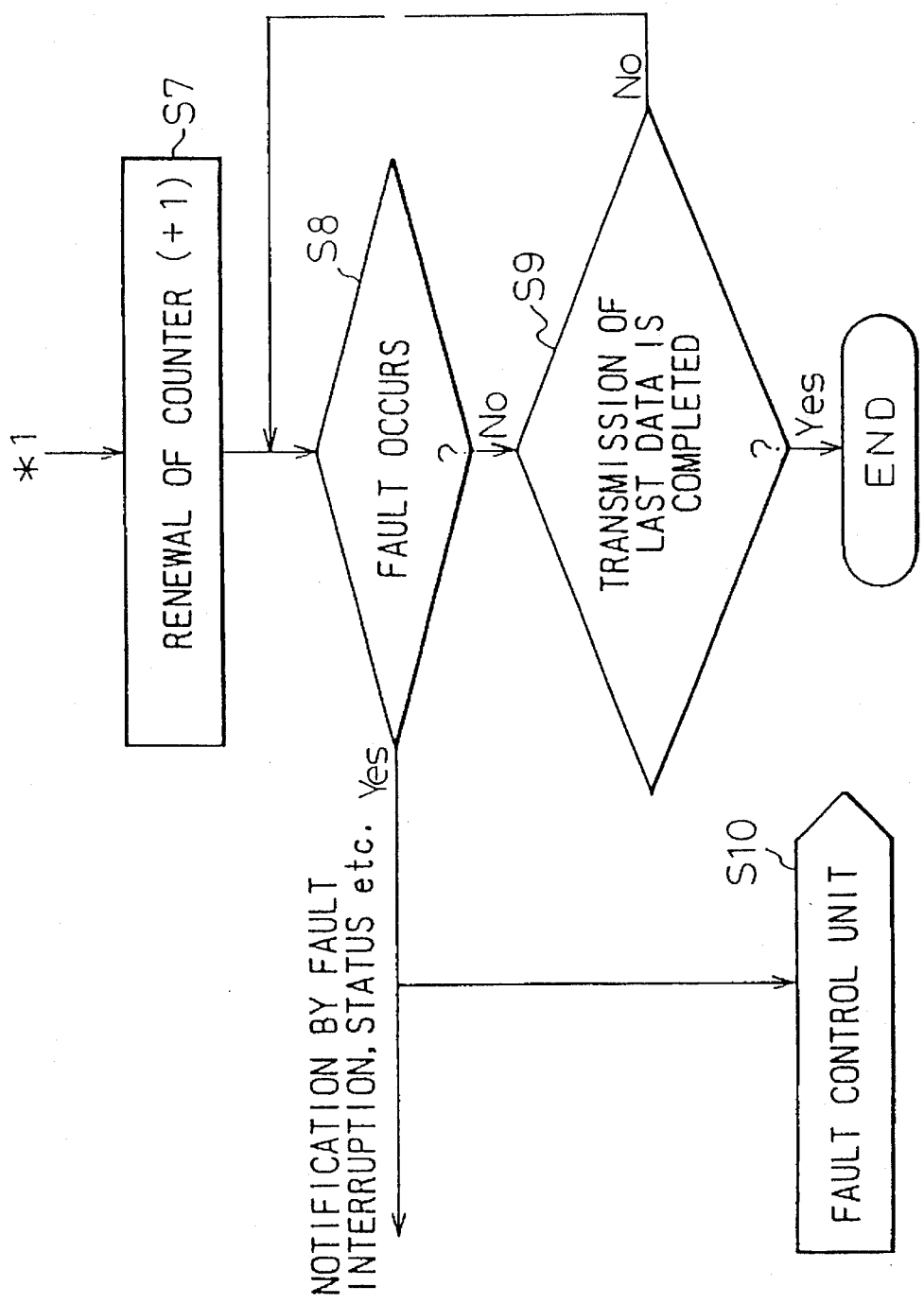
FIG. 9 is a view of the flow of the control of transmission with respect to the system bus of the bus interface units (part 3) in accordance with the invention.

FIG. 8 and FIG. 9 are views of the flow of the control of transmission with respect to the system bus of the bus interface units. If a "transmission request" is issued from the preceding functional unit (CPU or BIU), the following functional unit sets its own ID at the first step S1 as the SID (sender ID information) in the information frame SF. Note that the steps after step S1 do not apply only to the bus interface unit $BIU_{00}$ and are similar in the following bus interface units.

Next, the ID information of the destination functional unit is set in the information frame SF as the DID (S2), then the control codes, data, and layer information are set in the SF (S3) and sent out.

Assume that the second and later bus interface units normally receive the SF by the bus reception control unit 27. The normally receiving bus interface units start the transmission control by the bus access control unit 26 and send out the signal REQ (S4). When a signal ACK is received in response, they then activate the transmission (S5). Next, transmission (S6) of the inherent information frame SF starts (S6).

Referring to FIG. 9, the transmission data is normally received, relayed, and once again transmitted, so the number of relayed units is incremented by 1 by the counter means 25 (S7).

The fact that no fault has occurred is confirmed (S8) and at the same time a series of data (data 0, data 1 . . .) is transmitted to the end (S9).

At this time, if the occurrence of a fault is detected at step S8, the bus interface unit $BIU_{00}$ or bus interface unit $BIU_{10}$ of FIG. 2 notifies the associated central processing unit $CPU_{00}$ or central processing unit $CPU_{10}$ of the fault interruption, error status, etc. The simple relay unit (BIU) activates the fault monitor/control unit 23 (S10). The subsequent processing is described later.

FIG. 10 and FIG. 11 illustrate the flow of the control of reception with respect to the system bus of the bus interface units. If the previously mentioned signals BS, L-COUNT, BK, etc. are received from the preceding functional unit, the bus interface unit receiving the same activates the bus reception control unit 27 (S1).

If the destination ID information (DID) written in the reception information frame SF does not match the unit's own ID, the bus interface unit investigates for the presence of the layer count signal L-COUNT (S4). If there is an L-COUNT, it increments (+1) the number of relayed units by the counter means 25 (S5).

Note that when the destination ID information (DID) matches with the unit's own ID at step S2, the bus interface unit performs reception processing (S3) and ends the routine.

At FIG. 11, if the bus interface unit does not detect the occurrence of a fault (S6), it confirms that all the information frames SF have been received (S7) and then ends the routine (S8).

If the bus interface unit detects the occurrence of a fault at step S6, however, it notifies any central processing unit connected to it of the fault interruption, error status, etc. If it is merely a relaying bus interface unit, then it activates its internal fault monitor/control unit 23 (S9). The subsequent processing is described later.

FIG. 12 and FIG. 13 illustrate the flow of the control of transmission with respect to the fault monitoring bus of the bus interface units. If the occurrence of a fault is detected in the bus interface unit, the fault monitor/control unit 23 is activated (S1). At this time, the sender ID information (SID) and the destination ID information (DID) are extracted from the received information frame SF and stored in the register means 29 (S2). Similarly, the information on the number of relayed units from the counter means 25 is stored in the register means 29 (S3).

The information showing the classification of the fault which has occurred is prepared in the form of a predetermined code (S4).

After this, the series of protocols explained with reference to (8), (9), (10), and (11) in FIG. 6 and FIG. 7 is executed at steps S5 and S6 in FIG. 12 and S7 in FIG. 13. By this, fault information flows on the fault monitoring bus 21.

If there is no transmission fault in the fault information at this time (S8), the bus interface unit sends all of the information (S9) and then ends the routine.

If a transmission fault had occurred at step S8, then the conventional fault search sequence is started using the system bus 13. If the transmission fault cannot be eliminated even in this way, the system goes down.

FIG. 14 and FIG. 15 illustrate the flow of the control of reception with respect to the fault monitoring bus of the bus interface units. When the bus interface unit (master) detecting the fault accesses the fault monitoring bus 21 and outputs the previously mentioned signals BS and BK, all of the other bus interface units (slaves) activate the reception control operation at the fault monitor/control units 23 (S1).

These slave side bus interface units read the sender ID information (SID) and destination ID information (DID) from the error information frame EF being received and detect if these match with their own ID's (S2). If they do not match, then the bus interface units judge that the fault does not relate to themselves and ignore the same.

On the other hand, when matching either the sender ID information (SID) or the destination ID information (DID), it is possible to determine that some sort of fault has occurred relating to the bus interface unit detecting that match.

In this case, when there is a fault in the reception of the fault information from the fault monitoring bus 21 (S3), it is possible to start the conventional search sequence using the system bus 13. If there is no such fault, then the series of fault information (EF) is received to the end (S4).

Moving on now to FIG. 15, when a bus interface unit's own ID matches the sender ID information (SID) among the received sender ID information (SID) and destination ID information (DID), it means that unit is the bus interface unit sending the data. At step S6, it therefore collects the ID (DID) of the destination bus interface unit, the fault code (what kind of fault), and the layer information (where the fault is) from the error information frame EF (S6) and sends out a notification of a transmission error. If there is a central processing unit connected to the bus interface unit, then that bus interface unit notifies the central processing unit of the occurrence of a fault by a fault interruption, error status, etc.

On the other hand, when a unit's own ID matches the destination ID information (DID) at step S5, it means that unit is the destination bus interface unit. At step S8, it therefore collects the ID (SID) of the sender bus interface unit, the fault code (what kind of fault), and the layer information (where the fault is) from the error information frame EF and sends out a notification of a reception error (S9). If there is a central processing unit connected to the bus interface unit, then that bus interface unit notifies the central processing unit of the occurrence of a fault by a fault interruption, error status, etc. In this case, if the bus interface unit corresponding to the abovementioned bus interface unit is the bus interface unit $BIU_{10}$ of FIG. 2, the bus interface unit $BIU_{10}$ of course and also the central processing unit $CPU_{10}$ connected to it could not learn of the fault at the x mark on the system bus 13 in the past, but according to the present invention, the bus interface unit $BIU_{10}$ of course and also the central processing unit $CPU_{10}$ learn of the fault by steps S5→S8→S9 of FIG. 15. As a result, the central processing unit $CPU_{10}$ is able to take some action against the fault. The content of the action, for example, the self diagnosis of the central processing unit $CPU_{10}$ or the commencement of the diagnosis of the bus interface unit $BIU_{10}$ may be decided by the user.

As explained above, according to the present invention, it becomes possible to swiftly restore the multi-CPU system from a faulty state, and the functional units (BIU's and CPU's) downstream of a faulty portion learn of the occurrence of the fault.

We claim:

1. A multi-CPU system comprising a plurality of central processing units connected through a system bus to each other and transmitting and receiving data through a plurality of bus interface units connected in the system bus, said bus interface units transmitting and receiving data by independent bus communication protocol terminations between one of an adjoining central processing unit and bus interface unit, and between two adjoining bus interface units, and further comprising a fault monitoring bus, which is commonly assessed by all bus interface units, in parallel with the system bus, and wherein a bus interface unit which detects a fault when a fault occurs serves as a master unit and transmits fault information on the fault monitoring bus, the other bus interface units serving as slaves and receiving the fault information on the fault monitoring bus, each of the bus interface units includes a fault monitor/control unit which monitors an occurrence of a fault in its unit and, when such a fault has occurred, outputs fault information and transmits said fault information on the fault monitoring bus, said fault information output by the fault monitor/control unit is included in an error information frame, said error information frame having an area including sender ID information (SID) for specifying an origin of the data and destination ID information (DID) for specifying a destination of the data.

2. A multi-CPU system as in claim 1, wherein each of the bus interface units includes a layer control unit for monitoring how many bus interface units have been relayed through until reception of said fault information, and for writing the number of relayed units as fault layer information (L) through the fault monitor/control unit to the error information frame (EF).

3. A multi-CPU system as in claim 2, wherein a layer count line connects layer control units in adjoining bus interface units and each of the layer control units includes counter means which increment the number of relayed units notified through the layout count line each time data is relayed.

4. A multi-CPU system as in claim 2, wherein the error information frame (EF) prepared by the fault monitor/control unit has an area for writing a fault code of a detected fault and additional information showing details of the fault.

5. A multi-CPU system as in claim 3, wherein said fault monitor/control unit includes register means for storing the sender ID information (SID), destination ID information (DID), and number of relayed units from the counter means when a fault has occurred.

6. A multi-CPU system comprising a plurality of central processing units connected through a system bus to each other and transmitting and receiving data through a plurality of bus interface units connected in the system bus, said bus interface units transmitting and receiving data by independent bus communication protocol terminations between one of an adjoining central processing unit and bus interface unit, and between two adjoining bus interface units, further comprising:

a fault monitoring bus in parallel with the system bus, and commonly accessed by all bus interface units, and wherein a bus interface unit which detects a fault when a fault occurs serves as a master unit and transmits fault information on the fault monitoring bus, the other bus interface units serving as slaves and receiving the fault information on the fault monitoring bus;

each of said bus interface units including a fault monitor/control unit which monitors an occurrence of a fault in its unit and, when such a fault has occurred, outputting fault information and transmitting said fault information on said fault monitoring bus, said fault information output by said fault monitor/control unit being included in an error information frame, said error information frame having an area including sender ID information (SID) for specifying an origin of the data and destination ID information (DID) for specifying a destination of the data, said bus interface units serving as slaves recognize an occurrence of transmission error in data transmitted when received sender ID information (SID) matches with respective ID information of a receiving one of said bus interface units serving as slaves, and said receiving one interface unit sending said fault information shown in the error information frame (EF) to the adjoining central processing unit.

7. A multi-CPU system comprising a plurality of central processing units connected through a system bus to each other and transmitting and receiving data through a plurality of bus interface units connected in the system bus, said bus interface units transmitting and receiving data by independent bus communication protocol terminations between one of an adjoining central processing unit and bus interface unit, and between two adjoining bus interface units, further comprising:

a fault monitoring bus in parallel with the system bus, and commonly accessed by all bus interface units, and wherein a bus interface unit which detects a fault when a fault occurs serves as a master unit and transmits fault information on the fault monitoring bus, the other bus interface units serving as slaves and receiving the fault information on the fault monitoring bus, each of said bus interface units including a fault monitor/control unit which monitors an occurrence of a fault in its unit and, when such a fault has occurred, outputting fault information and transmitting said fault information on said fault monitoring bus, said fault information output by said fault monitor/control unit being included in an error information frame, said error information frame having an area including sender ID information (SID) for specifying an origin of the data and destination ID information (DID) for specifying a destination of the data, said bus interface units serving as slaves recognize an occurrence of reception error in data scheduled to be received when received destination ID information (DID) matches with respective ID information of a receiving one of said bus interface units acting as slaves, and said receiving one interface unit sending fault information shown in the error information frame (EF) to the adjoining central processing unit.

\* \* \* \* \*